United States Patent [19]
Tendo et al.

[11] Patent Number: 5,773,508
[45] Date of Patent: Jun. 30, 1998

[54] COATING VARNISH COMPOSITION AND ANTIFOULING COATING COMPOSITION

[75] Inventors: Kazuyoshi Tendo, Ishioka; Seiji Tai; Koichi Kamijima, both of Hitachi; Hiroyuki Tanaka, Mito, all of Japan

[73] Assignee: Hitachi Chemical Company, Ltd., Tokyo, Japan

[21] Appl. No.: 535,581

[22] Filed: Sep. 28, 1995

[30] Foreign Application Priority Data

Sep. 29, 1994 [JP] Japan ................................. 6-233940
Sep. 29, 1994 [JP] Japan ................................. 6-233941
Sep. 29, 1994 [JP] Japan ................................. 6-233942

[51] Int. Cl.[6] ............................ C08L 33/04; C09D 5/16
[52] U.S. Cl. ......................... 524/549; 524/547; 524/555; 524/559; 526/271; 526/286; 526/310; 526/318.2
[58] Field of Search ................................ 524/549, 547, 524/555, 559; 526/271, 286, 310, 318.2

[56] References Cited

U.S. PATENT DOCUMENTS

| 4,270,953 | 6/1981 | Nakagawa et al. | 106/16 |
|---|---|---|---|
| 5,064,897 | 11/1991 | Tazi et al. | 526/318 |
| 5,130,369 | 7/1992 | Hughes et al. | 526/310 |
| 5,155,171 | 10/1992 | Meyer et al. | 526/318 |
| 5,352,729 | 10/1994 | Birkhofer et al. | 524/556 |

FOREIGN PATENT DOCUMENTS

| 0 256 728 | 2/1988 | European Pat. Off. . |
|---|---|---|
| 0 406 015 | 1/1991 | European Pat. Off. . |
| 0 573 037 | 12/1993 | European Pat. Off. . |
| 50-29654 | 3/1975 | Japan . |
| 86/02660 | 5/1986 | Japan . |
| 62-135575 | 6/1987 | Japan . |
| 2-99567 | 4/1990 | Japan . |
| 508 822 | 7/1939 | United Kingdom . |
| 843539 | 8/1960 | United Kingdom . |
| 1 173 803 | 12/1969 | United Kingdom . |
| 1497683 | 1/1978 | United Kingdom . |
| 85 02972 | 7/1985 | WIPO . |

OTHER PUBLICATIONS

Patent Abstracts of Japan vol. 17, No. 391 (C–1087) 22 Jul. 1993 & JP 05 070525 A (Daicel Chem Ind) 23 Mar. 1993—abstract.

Chemical Abstracts, vol. 94 No. 18, 4 May 1981 (Ohio USA) abstract Overmars et al "Synthesis and application of polymer".

Patent Abstracts of Japan, vol. 106, No. 490 (C–0994), 12 Oct. 1992.

Yukagaku, vol. 34, pp. 456–466 (1985).

*Primary Examiner*—Vasu Jagannathan
*Assistant Examiner*—Olga Asinovsky
*Attorney, Agent, or Firm*—Antonelli, Terry, Stout & Kraus, LLP

[57] ABSTRACT

An antifouling coating composition comprising a biodegradable polymer (A) comprising one or more constituent units (a) capable of imparting biodegradability such as derived from an alkyl vinyl ether, and one or more constituent units (b) derived from e.g. maleic anhydride, itaconic anhydride, or an unsaturated dicarboxylic acid monoester, and an antifouling agent is excellent in coating consuming properties, antifouling performance, biodegradability and other properties.

12 Claims, No Drawings

COATING VARNISH COMPOSITION AND ANTIFOULING COATING COMPOSITION

BACKGROUND OF THE INVENTION

The present invention relates to a coating varnish composition and an antifouling coating composition to be used for preventing attachment of marine organisms to the underwater or submarine structures such as ships, fishing nets, drainage conduits, etc.

Numerous species of marine organisms, such as barnacle, ascidian, serpula, mussel, laver, etc., live in the seawater. When a structure such as a ship, fishing net, drainage pipe, etc., is set or placed in commission in or on the sea, the marine organisms cling to the structure and grow to give various kinds of damage to the structure. For instance, if the ship's bottom is incrusted with marine organisms, the frictional resistance of the seawater increases to cause a reduction of cruising performance of the ship, so that if it is tried to keep a constant cruising speed of the ship, its fuel consumption increases to pose a serious economical problem. Also, if the marine organisms cling to the fishing nets used for ocean culture, the meshes of the nets would be clogged up, which could prove fatal to the cultured fishes and shellfishes.

Hitherto, in order to prevent attachment of the marine organisms to the underwater structures such as mentioned above, the antifouling paints using homopolymers or copolymers of organotin-containing unsaturated monomers as resinous component (see Japanese Patent Examined Publication (JP-B)-40-21426, JP-B-44-9579, JP-B-46-13392, JP-B-49-20491, JP-B-51-11647, JP-B-51-12049, JP-B-52-48170, etc.) have been applied on said structures. These polymers have their organotin portion hydrolyzed with the seawater (pH: 8.0–8.3). As a result, the organotin serves as an antifouling agent and moreover the polymer surface which has been made soluble in seawater is gradually corroded by the moving seawater to bare out the new coating surface, thus producing a long-lasting stabilized antifouling effect. However, the organotin released into the seawater from the paints is hard to decompose and may be taken in by and accumulated in the marine organism, and through the food chain, it may get into the human system. This involves the possibility of causing serious physical troubles such as deformity. So, use of the organotin compounds has been limited by law.

Request is now voiced in the art for the development of a resin for antifouling paints which is capable of producing a long-lasting stabilized antifouling effect, in place of the organotin-based resins which involve such a high order of danger. Accordingly, various hydrolyzable resins having a specific carboxylic acid ester in the side chain have been proposed (Japanese Patent Application Kohyo No. 60-500452, Japanese Patent Unexamined Publication (JP-A)-2-69576, JP-A-63-215780, JP-B-55-39271, JP-A-62-57464, JP-B-61-3830, etc.), but their effect has not been satisfactory at all.

On the other hand, it has been proposed that a copolymer of an acid anhydride such as maleic anhydride or a derivative thereof having a free carboxyl group is used for said purpose (JP-A-50-29654, Japanese Patent Application Kohyo No. 62-501293, JP-A-2-99567, JP-A-51-124130, JP-A-62-135576 and Japanese Patent Application Kohyo No. 62-501293). However, there is the following problem: of such copolymers, the (meth)acrylic esters described in the examples in the above references are hardly decomposed in the natural world, and when used in an antifouling paint, they are dissolved in the seawater and then accumulated in the sea for an indefinite time.

In the above references, it has been proposed that a copolymer of maleic anhydride and vinyl acetate, vinyl butyrate or vinyl pivalate or a copolymer of maleic anhydride and methyl vinyl ether or ethyl vinyl ether is used for said purpose as a binder resin, but the biodegradability of the copolymers is not considered at all.

On the other hand, Yukagaku, Vol. 34, p. 456 (1985) reports that a sodium salt of maleic anhydride-methyl vinyl ether copolymer and a sodium salt of maleic anhydride-vinyl acetate copolymer are biodegradable. It is speculated that the above-mentioned copolymers become soluble in the seawater and are dissolved in the seawater to become biodegradable sodium salts. However, when the above-mentioned copolymer is used in an antifouling paint, the dispersibility of various additives such as an antifouling agent is poor, so that it has been difficult to obtain a satisfactory coating film. Accordingly, the present invention provides a coating varnish composition and an antifouling coating composition which have no poisonous action unlike the organotin copolymers, have no undesirable influence on the ecosystem because of their biodegradation by microorganisms after dissolution in the seawater, and can form a satisfactory coating film capable of maintaining an excellent antifouling effect for a long period of time.

SUMMARY OF THE INVENTION

In order to solve such problems and develop an antifouling paint which is excellent in the above-mentioned property of preventing attachment of the marine organisms and has no undesirable influence on the ecosystems, the present inventors earnestly investigated and consequently found that a copolymer comprising one or more kinds of constituent units selected from constituent units derived from maleic anhydride derivatives, itaconic anhydride derivatives or unsaturated dicarboxylic acid monoesters and one or more kinds of constituent units derived from specific unsaturated monomers is biodegradable, and that a coating varnish composition containing such a copolymer can form a very good coating film because the dispersibility of various additives such as an antifouling agent in the composition is very good. Thus, the present invention has been accomplished.

The present invention relates to the following items (1) to (15).

(1) A coating varnish composition comprising a biodegradable polymer (A) comprising one or more kinds of constituent units (b) represented by the general formula (I), (II) or (III) and one or more other kinds of constituent units (a) capable of imparting bio-degradability:

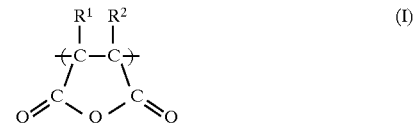

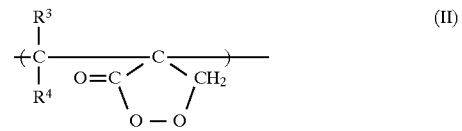

-continued

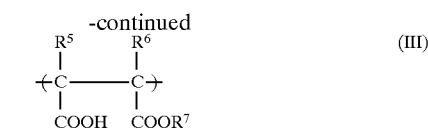  (III)

[in the formula (I), $R^1$ and $R^2$ are independently a hydrogen atom, a chlorine atom, a bromine atom, a methyl group, an ethyl group or a phenyl group; in the formula (II), $R^3$ and $R^4$ are independently a hydrogen atom, a chlorine atom, a bromine atom, or a substituted or unsubstituted methyl or ethyl group; in the formula (III), $R^5$ and $R^6$ are independently a hydrogen atom, a methyl group or an ethyl group, and $R^7$ is a straight, branched or cyclic alkyl group, an aryl group, a heterocyclic group or an aralkyl group, which may have one or more substituents].

(2) A coating varnish composition according to the above item (1), wherein the constituent unit (a) is represented by the general formula (IV):

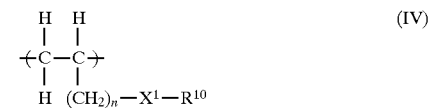  (IV)

wherein n is zero or 1; $X^1$ is an oxygen atom, a sulfur atom or —NH—; and $R^{10}$ is a straight, branched or cyclic alkyl group, an aryl group, a heterocyclic group, an aralkyl group or an acyl group, which may be substituted by an alkoxycarbonyl group, provided that when 20 constituent units of the general formula (I) are used as the constituent units of the copolymer (A), there is excluded the case where n is zero, $X^1$ is an oxygen atom and $R^{10}$ is an alkyl group having 1 or 2 carbon atoms or an acyl group having 1 to 5 carbon atoms.

(3) A coating varnish composition according to the above item (2), wherein the constituent unit of the general formula (IV) is that of the general formula (V):

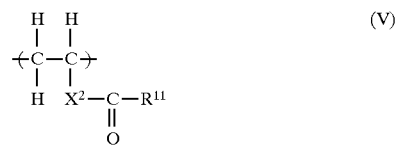  (V)

wherein $X^2$ is an oxygen atom or a sulfur atom; and $R^{11}$ is a hydrogen atom, a straight, branched or cyclic alkyl group, an aryl group, a heterocyclic group or an aralkyl group, provided that when constituent units of the general formula (I) are used as the constituent units of the polymer (A), there is excluded the case where $X^2$ is an oxygen atom and $R^1 1$ is a hydrogen atom or an alkyl group having 1 to 4 carbon atoms.

(4) A coating varnish composition according to the above item (2), wherein the constituent unit of the general formula (IV) is that of the general formula (VI):

  (VI)

wherein $X^3$ is an oxygen atom or a sulfur atom; and $R^{12}$ is a straight, branched or cyclic alkyl group, an aryl group, a heterocyclic group or an aralkyl group, provided that when constituent units of the general formula (I) are used as the constituent units of the copolymer (A), there is excluded the case where $X^3$ is an oxygen atom and $R^{12}$ is an alkyl group having 1 or 2 carbon atoms.

(5) A coating varnish composition according to the above item (2), wherein the constituent unit of the general formula (IV) is that of the general formula (VII):

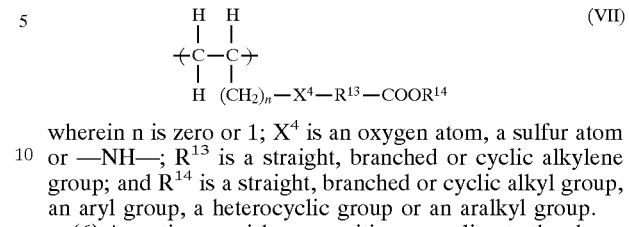  (VII)

wherein n is zero or 1; $X^4$ is an oxygen atom, a sulfur atom or —NH—; $R^{13}$ is a straight, branched or cyclic alkylene group; and $R^{14}$ is a straight, branched or cyclic alkyl group, an aryl group, a heterocyclic group or an aralkyl group.

(6) A coating varnish composition according to the above item (3), wherein in the constituent unit of the general formula (V), $X^2$ is an oxygen atom and $R^{11}$ is any of one or more kinds of alkyl groups selected from alkyl groups having 5, 9, 11, 13 or 17 carbon atoms.

(7) A coating varnish composition according to the above item (4), wherein in the constituent unit of the general formula (VI), $X^3$ is an oxygen atom and $R^{12}$ is any of one or more kinds of alkyl groups selected from alkyl groups having 4, 8 or 18 carbon atoms.

(8) A coating varnish composition according to any of the above items (1) to (7), which further comprises at least one compound (B) having both a hydrophobic group and a hydrophilic group in the molecule and a melting point of 0° C. or higher.

(9) A coating varnish composition according to the above item (8), wherein the compound (B) is selected from the group consisting of alcohols, carboxylic acid esters, phosphoric acid esters, amides and thioureas.

(10) An antifouling coating composition comprising the coating varnish composition of any of the above items (1) to (9) and an antifouling agent.

(11) An antifouling coating composition according to the above item (10), wherein the anti-fouling agent is an organic antifouling agent.

(12) An antifouling process comprising applying the antifouling coating composition of the above item (10) or (11) on an underwater or submarine structure.

(13) A coating varnish composition comprising the coating varnish composition of any of the above items (1) to (9) and at least one compound (C) selected from the group consisting of triazole derivatives, thiadiazole derivatives and benzothiazole derivatives.

(14) An antifouling coating composition comprising the coating varnish composition of the above item (13) and an antifouling agent composed mainly of a copper compound.

(15) An antifouling process comprising applying the antifouling coating composition of the above item (14) on an underwater or submarine structure.

DESCRIPTION OF THE PREFERRED EMBODIMENTS

In the present invention, the constituent units of the general formula (I) can be obtained by polymerizing a maleic anhydride derivative. Preferable specific examples of the maleic anhydride derivative used for obtaining the constituent units of the general formula (I) are maleic anhydride, methylmaleic anhydride, dimethylmaleic anhydride, ethylmaleic anhydride, diethylmaleic anhydride, chloromaleic anhydride, dichloromaleic anhydride, bromomaleic anhydride, dibromomaleic anhydride, phenylmaleic anhydride, etc. Of these, maleic anhydride, methylmaleic anhydride, dimethylmaleic anhydride, ethylmaleic anhydride and diethylmaleic anhydride are more preferable. Maleic anhydride is especially preferable.

When only the constituent units of the general formula (I) are used as the constituent units (b), the proportion of the constituent units of the general formula (I) is 20 to 80 mol %, preferably 30 to 70 mol %, more preferably 40 to 60 mol %, most preferably 45 to 50 mol %, based on the amount of the polymer (A). When the proportion is less than 20 mol %, it is difficult to obtain a resin having satisfactory coating properties. When the proportion is more than 80 mol %, the resulting polymer tends to be poor in biodegradability.

Either one kind or a combination of two or more kinds of such constituent units of the general formula (I) may be used in the polymer.

The constituent units of the general formula (II) can be obtained by polymerizing an itaconic anhydride derivative. Preferable specific examples of the itaconic anhydride derivative used for obtaining the constituent units of the general formula (II) are itaconic anhydride, 2-ethylidenesuccinic anhydride, 2-isopropylidenesuccinic anhydride, 2-propylidenesuccinic anhydride, 2-chloromethylenesuccinic anhydride, 2-bromomethylenesuccininc anhydride, etc. Of these, itaconic anhydride, 2-ethylidenesuccinic anhydride, 2-isopropylidenesuccinic anhydride and 2-propylidenesuccinic anhydride are more preferable. Itaconic anhydride is especially preferable.

When only the constituent units of the general formula (II) are used as the constituent units (b), the proportion of the constituent units of the general formula (II) is 1 to 80 mol %, preferably 20 to 60 mol %, more preferably 30 to 50 mol %, based on the amount of the polymer (A). When the proportion is less than 1 mol %, it is difficult to obtain a resin having satisfactory coating properties. When the proportion is more than 80 mol %, the resulting polymer tends to be poor in biodegradability.

Either one kind or a combination of two or more kinds of such constituent units of the general formula (II) may be used in the polymer.

The constituent units of the general formula (III) can be obtained by polymerizing an unsaturated dicarboxylic acid monoester. They can be obtained also by polymerizing an unsubstituted dicarboxylic acid anhydride and esterifying the resulting polymer. As the group represented by $R^7$ in the general formula (III), i.e., the straight, branched or cyclic alkyl group, the aryl group, the heterocyclic group or the aralkyl group, which have 1 to 20 carbon atoms and may have one or more substituents, there can be exemplified methyl group, ethyl group, propyl group, isopropyl group, butyl group, isobutyl group, sec-butyl group, tert-butyl group, pentyl group, isopentyl group, sec-pentyl group, tert-pentyl group, neopentyl group, 2-ethylhexyl group, cyclopropyl group, cyclobutyl group, cyclopentyl group, cyclohexyl group, phenyl group, o-tolyl group, m-tolyl group, p-tolyl group, 2,3-xylyl group, 2,4-xylyl group, o-cumenyl group, m-cumenyl group, p-cumenyl group, mesityl group, benzyl group, phenetyl group, benzhydryl group, trityl group, 1-naphthyl group, 2-naphthyl group, norbornyl group, 2-furyl group, 3-furyl group, furfuryl group, 2-thienyl group, 3-thienyl group, 2-thenyl group, 2-pyrrolyl group, 3-pyrrolyl group, 2-pyridyl group, 3-pyridyl group, 4-pyridyl group, etc.

Preferable specific examples of the un-saturated dicarboxylic acid monoester used for obtaining the constituent units of the general formula (III) are monomethyl maleate, monoethyl maleate, monopropyl maleate, monobutyl maleate, monomethoxyethyl maleate, monoethoxyethyl maleate, monobutoxyethyl maleate, monomethyl methylmaleate, monoethyl methylmaleate, monopropyl methylmaleate, monobutyl methylmaleate, monomethyl dimethylmaleate, monoethyl dimethylmaleate, monopropyl dimethylmaleate, monobutyl dimethylmaleate, monomethyl ethylmaleate, monoethyl ethylmaleate, monopropyl ethylmaleate, monobutyl ethylmaleate, monomethyl diethylmaleate, monoethyl diethylmaleate, monopropyl diethylmaleate, monobutyl diethylmaleate, monomethyl fumarate, monoethyl fumarate, monopropyl fumarate, monobutyl fumarate, monomethoxyethyl fumarate, monoethoxyethyl fumarate, monobutoxyethyl fumarate, monomethyl methylfumarate, monoethyl methylfumarate, monopropyl methylfumarate, monobutyl methylfumarate, monomethyl dimethylfumarate, monoethyl dimethylfumarate, monopropyl dimethylfumarate, monobutyl dimethylfumarate, monomethyl ethylfumarate, monoethyl ethylfumarate, monopropyl ethylfumarate, monobutyl ethylfumarate, monomethyl diethylfumarate, monoethyl diethylfumarate, monopropyl diethylfumarate, monobutyl diethylfumarate, etc. Of these, monomethyl maleate, monoethyl maleate, monopropyl maleate, monobutyl maleate, monomethyl fumarate, monoethyl fumarate, monopropyl fumarate and monobutyl fumarate are more preferable. Monobutyl maleate and monobutyl fumarate are especially preferable.

Preferable specific examples of the unsaturated dicarboxylic acid anhydride used for obtaining the constituent units of the general formula (III) are maleic anhydride, methylmaleic anhydride, dimethylmaleic anhydride, ethylmaleic anhydride, diethylmaleic anhydride, etc. Maleic anhydride is especially preferable.

When the above-exemplified unsaturated carboxylic acid anhydride is used for obtaining the constituent units of the general formula (III), it is necessary to esterify the acid anhydride group after the polymerization. The esterification can be carried out by any of various conventional methods. For example, when the esterification is carried out with an alcohol, a monoester illustrated by the constituent unit of the general formula (III) can usually be obtained.

When only the constituent units of the general formula (III) are used as the constituent units (b), the proportion of the constituent units of the general formula (III) is 20 to 80 mol %, preferably 30 to 50 mol %, more preferably 45 to 50 mol %, based on the amount of the polymer (A). When the proportion is less than 20 mol %, it is difficult to obtain a resin having satisfactory coating properties. When the proportion is more than 80 mol %, the resulting polymer tends to be poor in biodegradability.

Either one kind or a combination of two or more kinds of such constituent units of the general formula (III) may be used in the polymer (A).

When a combination of two or more kinds of constituents units selected from the constituent units of the general formulas (I), (II) and (III) is used as the constituent units (b), the proportions of the constituent units of the general formulas (I), (II) and (III) are 0 to 75 mol %, 0 to 75 mol % and 0 to 75 mol %, respectively, based on the amount of the polymer. The total amount of the constituent units of the general formulas (I), (II) and (III) is 20 to 80 mol %, preferably 30 to 60 mol %, more preferably 40 to 50 mol %, on the amount of the polymer (A).

In the present invention, the constituent units of the general formula (IV) constituting the biodegradable polymer (A) are not particularly limited so long as the resulting polymer (A) is biodegradable.

As the group represented by $R^{10}$ in the general formula (IV), i.e., the straight, branched or cyclic alkyl group, the aryl group, the heterocyclic group or the aralkyl group, which have 1 to 20 carbon atoms and may be substituted by an alkoxycarbonyl group, there can be exemplified methyl group, ethyl group, propyl group, isopropyl group, butyl group, isobutyl group, sec-butyl group, tert-butyl group, pentyl group, isopentyl group, sec-pentyl group, tert-pentyl group, neopentyl group, 2-ethylhexyl group, cyclopropyl group, cyclobutyl group, cyclopentyl group, cyclohexyl group, phenyl group, o-tolyl group, m-tolyl group, p-tolyl group, 2,3-xylyl group, 2,4-xylyl group, o-cumenyl group, m-cumenyl group, p-cumenyl group, mesityl group, benzyl group, phenetyl group, benzhydryl group, trityl group, 1-naphthyl group, 2-naphthyl group, norbornyl group, 2-furyl group, 3-furyl group, furfuryl group, 2-thienyl group, 3-thienyl group, 2-thenyl group, 2-pyrrolyl group, 3-pyrrolyl group, 2-pyridyl group, 3-pyridyl group, 4-pyridyl group, etc.

In the present invention, preferable examples of the constituent unit of the general formula (IV) are constituent units of the following general formula (V), constituent units of the general formula (VI) and constituent units of the general formula (VII):

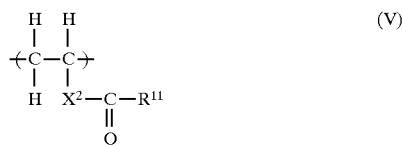

[in the formula (V), $X^2$ is an oxygen atom or a sulfur atom, and $R^{11}$ is a straight, branched or cyclic alkyl group, an aryl group, a heterocyclic group or an aralkyl group, provided that when constituent units of the general formula (I) are used as the constituent units of the polymer (A), there is excluded the case where $X^2$ is an oxygen atom and $R^{11}$ is a hydrogen atom or an alkyl group having 1 to 4 carbon atoms; in the formula (VI), $X^3$ is an oxygen atom or a sulfur atom, and $R^{12}$ is a straight, branched or cyclic alkyl group, an aryl group, a heterocyclic group or an aralkyl group, provided that when constituent units of the general formula (I) are used as the constituent units of the copolymer (A), there is excluded the case where $X^3$ is an oxygen atom and $R^{12}$ is an alkyl group having 1 or 2 carbon atoms; in the formula (VII), n is zero or 1, $X^4$ is an oxygen atom, a sulfur atom or —NH—, $R^{13}$ is a straight, branched or cyclic alkylene group, and $R^{14}$ is a straight, branched or cyclic alkyl group, an aryl group, a heterocyclic group or an aralkyl group].

For obtaining constituent units of any of the above general formulas in the polymer (A), an unsaturated monomer of the following general formula (VIII) can be used:

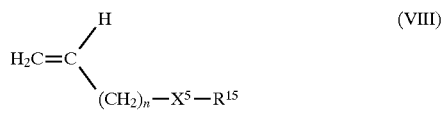

wherein n is zero or 1; $X^5$ is an oxygen atom, a sulfur atom or —NH—; and $R^{15}$ is a straight, branched or cyclic alkyl group, an aryl group, an aralkyl group, a heterocyclic cyclic group or an acyl group, which may be substituted by an alkoxycarbonyl group.

In the general formula (VIII), as the group represented by $R^{15}$, the straight, branched or cyclic alkyl group, the aryl group, the heterocyclic group, the aralkyl group or the acyl group, which may be substituted by an alkoxycarbonyl group, there are preferably used straight, branched or cyclic alkyl groups, aryl groups, heterocyclic groups, aralkyl groups or acyl groups, which have 1 to 20 carbon atoms. As the alkoxycarbonyl group used as a substituent in these groups, alkoxycarbonyl groups having 1 to 10 carbon atoms are preferable. Specific examples of the group represented by $R^{15}$ are methyl group, ethyl group, propyl group, isopropyl group, butyl group, isobutyl group, sec-butyl group, tert-butyl group, pentyl group, isopentyl group, sec-pentyl group, tert-pentyl group, neopentyl group, 2-ethylhexyl group, cyclopropyl group, cyclobutyl group, cyclopentyl group, cyclohexyl group, phenyl group, o-tolyl group, m-tolyl group, p-tolyl group, 2,3-xylyl group, 2,4-xylyl group, o-cumenyl group, m-cumenyl group, p-cumenyl group, mesityl group, benzyl group, phenetyl group, benzhydryl group, trityl group, 1-naphthyl group, 2-naphthyl group, norbornyl group, acetyl group, propynyl group, butyryl group, isobutyryl group, valeryl group, isovaleryl group, pivaloyl group, hexanoyl group, pentanoyl group, octanoyl group, nonanoyl group, decanoyl group, lauroyl group, myristoyl group, palmitoyl group, stearoyl group, cyclohexylcarbonyl group, benzoyl group, o-toluoyl group, m-toluoyl group, p-toluoyl group, 2,3-xyloyl group, 2,4-xyloyl group, 1-naphthoyl group, 2-naphthoyl group, 2-furyl group, 3-furyl group, furfuryl group, 2-thienyl group, 3-thienyl group, 2-thenyl group, 2-pyrrolyl group, 3-pyrrolyl group, 2-pyridyl group, 3-pyridyl group, 4-pyridyl group, etc.

Preferable specific examples of the unsaturated monomer of the general formula (VIII) are vinyl hexanoate, vinyl heptanoate, vinyl octanoate, vinyl nonanoate, vinyl decanoate, vinyl laurate, vinyl myristate, vinyl palmitate, vinyl stearate, vinyl benzoate, vinyl 2-methylbenzoate, vinyl 3-methylbenzoate, vinyl 4-methylbenzoate, vinyl 2,3-dimethylbenzoate, vinyl 2,4-dimethylbenzoate, vinyl 1-naphthalenecarboxylate, vinyl 2-naphthalenecarboxylate, vinyl 2-furancarboxylate, vinyl 3-furancarboxylate, vinyl 2-thiophenecarboxylate, vinyl 3-thiophenecarboxylate, vinyl nicotinate, vinyl isonicotinate, vinyl thiohexanoate, vinyl thioheptanoate, vinyl thiooctanoate, vinyl thiononanoate, vinyl thiodecanoate, vinyl thiolaurate, vinyl thiomyristate, vinyl thiopalmitate, vinyl thiostearate, vinyl thiobenzoate, vinyl 2-methylthiobenzoate, vinyl 3-methythiolbenzoate, vinyl 4-methylthiobenzoate, vinyl 2,3-dimethylthiobenzoate, vinyl 2,4-dimethylthiobenzoate, vinyl 1-naphthalenethiocarboxylate, vinyl 2-naphthalenethiocarboxylate, vinyl 2-furanthiocarboxylate, vinyl 3-furanthiocarboxylate, vinyl 2-thiophenethiocarboxylate, vinyl 3-thiophenethiocarboxylate, propyl vinyl ether, butyl vinyl ether, isobutyl vinyl ether, tert-butyl vinyl ether, pentyl vinyl ether, neopentyl vinyl ether, 2-ethylhexyl vinyl ether, dodecyl vinyl ether, octadecyl vinyl ether, phenyl vinyl ether, 1-naphthyl vinyl ether, 2-naphthyl vinyl ether, o-tolyl vinyl ether, m-tolyl vinyl ether, p-tolyl vinyl ether, 2,3-xylyl vinyl ether, 2,4-xylyl vinyl ether, benzyl vinyl ether, phenethyl vinyl ether, cyclohexyl vinyl ether, norbornyl vinyl ether, 2-furyl vinyl ether, 3-furyl vinyl ether, furfuryl vinyl ether, tetrahydrofurfuryl vinyl ether, 2-thienyl vinyl ether, 3-thienyl vinyl ether, 2-thenyl vinyl ether, 2-pyridyl vinyl ether, 3-pyridyl vinyl ether, 4-pyridyl vinyl ether, propyl vinyl sulfide, butyl vinyl sulfide, isobutyl vinyl sulfide, tert-butyl vinyl sulfide, pentyl vinyl sulfide, neopentyl vinyl sulfide, 2-ethylhexyl vinyl sulfide, dodecyl vinyl sulfide, octadecyl vinyl sulfide, phenyl vinyl sulfide, 1-naphthyl vinyl sulfide, 2-naphthyl vinyl sulfide, o-tolyl vinyl sulfide, m-tolyl vinyl sulfide, p-tolyl vinyl sulfide, 2,3-xylyl vinyl sulfide, 2,4-xylyl vinyl sulfide, benzyl vinyl sulfide, phenethyl vinyl sulfide, cyclohexyl vinyl sulfide, norbornyl vinyl sulfide, 2-furyl vinyl sulfide, 3-furyl vinyl sulfide, furfuryl vinyl sulfide, tetrahydrofurfuryl vinyl sulfide, 2-thienyl vinyl sulfide, 3-thienyl vinyl sulfide, 2-thenyl vinyl sulfide, 2-pyridyl vinyl sulfide, 3-pyridyl vinyl sulfide, 4-pyridyl vinyl sulfide, methyl vinyloxyacetate, ethyl vinyloxyacetate, butyl vinyloxyacetate, methyl vinyloxypropionate, ethyl vinyloxypropionate, butyl vinyloxypropionate, methyl vinyloxybutanoate, ethyl vinyloxybutanoate, butyl vinyloxybutanoate, methyl allyloxyacetate, ethyl allyloxyacetate, butyl allyloxyacetate, methyl allyloxypropionate, ethyl allyloxypropionate, butyl allyloxypropionate, methyl allyloxybutanoate, ethyl allyloxybutanoate, butyl allyloxybutanoate, methyl vinylthioacetate, ethyl vinylthioacetate, butyl vinylthioacetate, methyl vinylthiopropionate, ethyl vinylthiopropionate, butyl vinylthiopropionate, methyl vinylthiobutanoate, ethyl vinylthiobutanoate, butyl vinylthiobutanoate, methyl allylthioacetate, ethyl allylthioacetate, butyl allylthioacetate, methyl allylthiopropionate, ethyl allylthiopropionate, butyl allylthiopropionate, methyl allylthiobutanoate, ethyl allylthiobutanoate, butyl allylthiobutanoate, methyl N-allylaminoacetate, ethyl N-allylaminoacetate, butyl N-allylaminoacetate, methyl N-allylaminopropionate, ethyl N-allylaminopropionate, butyl N-allylaminopropionate, methyl N-allylaminobutanoate, ethyl N-allylaminobutanoate, butyl N-allylaminobutanoate, etc. Of these, vinyl hexanoate, vinyl octanoate, vinyl decanoate, vinyl laurate, vinyl myristate, vinyl stearate, butyl vinyl ether, isobutyl vinyl ether, 2-ethylhexyl vinyl ether, octadecyl vinyl ether, methyl vinyloxyacetate, ethyl vinyloxyacetate methyl allyloxyacetate, ethyl allyloxyacetate, methyl N-allylaminoacetate, ethyl N-allylaminoacetate and ethyl N-allylaminopropionate are more preferable. Vinyl hexanoate, vinyl laurate, vinyl stearate, butyl vinyl ether, isobutyl vinyl ether and octadecyl vinyl ether are especially preferable.

The constituent units of the general formula (IV) are contained in the polymer in a proportion of preferably 99 to 20 mol %, more preferably 70 to 40 mol %, most preferably 60 to 50 mol %, based on the amount of the polymer (A). When the proportion of said constituent units is more than 99 mol %, it is difficult to obtain a resin having satisfactory coating properties. When the proportion is less than 20 mol %, the resulting polymer tends to be poor in biodegradability.

Either one kind or a combination or two or more kinds of such constituent units of the general formula (IV) may be used in the polymer.

In the present invention, the constituent units of the general formula (V) can be obtained using, in particular, a vinyl ester compound among the monomers represented by the above general formula (VIII). In the general formula (V), as the group represented by $R^{11}$, i.e., the straight, branched or cyclic alkyl group, the aryl group, the heterocyclic group or the aralkyl group, which have 1 to 20 carbon atoms, there can be exemplified methyl group, ethyl group, propyl group, isopropyl group, butyl group, isobutyl group, sec-butyl group, tert-butyl group, pentyl group, isopentyl group, sec-pentyl group, tert-pentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, 2-ethylhexyl group, cyclopropyl group, cyclobutyl group, cyclopentyl group, cyclohexyl group, phenyl group, o-tolyl group, m-tolyl group, p-tolyl group, 2,3-xylyl group, 2,4-xylyl group, o-cumenyl group, m-cumenyl group, p-cumenyl group, mesityl group, benzyl group, phenetyl group, benzhydryl group, trityl group, 1-naphthyl group, 2-naphthyl group, norbornyl group, 2-furyl group, 3-furyl group, furfuryl group, 2-thienyl group, 3-thienyl group, 2-thenyl group, 2-pyrrolyl group, 3-pyrrolyl group, 2-pyridyl group, 3-pyridyl group, 4-pyridyl group, etc. Of these, methyl group, ethyl group, propyl group, pentyl group, heptyl group, nonyl group, undecyl group, tridecyl group, pentadecyl group and heptadecyl group are more preferable. Heptyl group, nonyl group, undecyl group and heptadecyl group are especially preferable.

In the present invention, the constituent units of the general formula (VI) can be obtained using, in particular, a vinyl ether compound or a vinyl sulfide compound among the monomers represented by the above general formula (VIII). In the general formula (VI), as the group represented by $R^{12}$, i.e., the straight, branched or cyclic alkyl group, the aryl group, the heterocyclic group or the aralkyl group, which have 1 to 20 carbon atoms, there can be exemplified methyl group, ethyl group, propyl group, isopropyl group, butyl group, isobutyl group, sec-butyl group, tert-butyl group, pentyl group, isopentyl group, sec-pentyl group, tert-pentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, 2-ethylhexyl group, cyclopropyl group, cyclobutyl group, cyclopentyl group, cyclohexyl group, phenyl group, o-tolyl group, m-tolyl group, p-tolyl group, 2,3-xylyl group, 2,4-xylyl group, o-cumenyl group, m-cumenyl group, p-cumenyl group, mesityl group, benzyl group, phenetyl group, benzhydryl group, trityl group, 1-naphthyl group, 2-naphthyl group, norbornyl group, 2-furyl group, 3-furyl group, furfuryl group, 2-thienyl group, 3-thienyl group, 2-thenyl group, 2-pyrrolyl group, 3-pyrrolyl group, 2-pyridyl group, 3-pyridyl group, 4-pyridyl group, etc. Of these, propyl group, butyl group, isobutyl group, tert-butyl group, 2-ethylhexyl group, dodecyl group and octadecyl group are preferable. Butyl group, isobutyl group and 2-ethylhexyl group are more preferable.

In the present invention, the constituent units of the general formula (VII) can be obtained using, in particular, a vinyloxycarboxylic acid ester compound, an allyloxycarboxylic acid ester compound, a vinylthiocarboxylic acid ester compound, an allylthiocarboxylic acid ester compound, a vinylaminocarboxylic acid ester compound or an allylaminocarboxylic acid ester compound among the monomers represented by the above general formula (VIII).

In the general formula (VII), as the straight, branched or cyclic alkylene group represented by $R^{13}$, there can be exemplified methylene group, ethylene group, trimethylene group, tetramethylene group, propylene group, ethylidene group, isopropylidene group, ethylethylene group, cyclohexylene group, phenylene group, etc. Of these, methylene group, ethylene group, propylene group and butylene group are preferable. Methylene group is more preferable. As the group represented by $R^{14}$ i.e., the straight, branched or cyclic alkyl group, the aryl group, the heterocyclic group or the aralkyl group, there can be exemplified methyl group, ethyl group, propyl group, isopropyl group, butyl group, isobutyl group, sec-butyl group, tert-butyl group, pentyl group, hexyl group, heptyl group, octyl group, nonyl group, decyl group, 2-ethylhexyl group, cyclohexyl group, phenyl group, etc. Of these, methyl group, ethyl group, propyl group and butyl group are preferable. Methyl group and ethyl group are more preferable.

Other monomers can be used in combination with the above-mentioned monomers so long as they do not lessen the effects such as the biodegradability of the polymer (A). As the other monomers, there can be exemplified styrene type monomers such as styrene, acrylic acid, methacrylic acid, alkyl esters of these acids, etc. When these monomers are used, their amount is preferably 30 mol % or less based on the total amount of the polymer (A).

The polymer (A) may be produced by any conventional method. A concrete production process is described below.

The polymer (A) can be produced by carrying out polymerization in a solvent solution of a maleic anhydride derivative, an itaconic anhydride derivative or an unsaturated dicarboxylic acid monoester while adding dropwise a solution or solvent solution containing another unsaturated monomer and a radical polymerization catalyst. It is also possible to carry out polymerization by mixing a maleic anhydride derivative, an itaconic anhydride derivative or an unsaturated dicarboxylic acid monoester, another unsaturated monomer, a radical polymerization catalyst and a solvent at the same time. The reaction temperature is usually approximately 0°–180° C., preferably approximately 40°–170° C. The dropwise addition is carried out over a period of usually 1 to 10 hours, preferably 2 to 6 hours.

The organic solvent used in the reaction is not particularly limited so long as it is inert to the maleic anhydride derivative, the itaconic anhydride derivative or the unsaturated dicarboxylic acid monoester and the other unsaturated monomer and dissolves the resulting polymer. As the organic solvent, either a single organic solvent or a mixture of two or more organic solvents may be used. The organic solvent includes, for example, ketone solvents such as acetone, methyl ethyl ketone, methyl butyl ketone, methyl isobutyl ketone, dibutyl ketone, cyclohexanone, etc.; ester solvents such as ethyl acetate, butyl acetate, ethyl propionate, etc.; aromatic hydrocarbon solvents such as toluene, xylene, etc.; aliphatic hydrocarbon solvents such as hexane, cyclohexane, etc.; cyclic ether solvents such as tetrahydrofuran, dioxane, etc.; acyclic ether solvents such as ethylene glycol diethyl ether, diethylene glycol dimethyl ether, diethylene glycol diethyl ether, etc.; halogen-containing solvents such as chloroform, methylene chloride, etc.; and aprotic polar solvents such as dimethyl sulfoxide, dimethylformamide, N-methyl-2-pyrrolidone, etc. Of these, methyl ethyl ketone, methyl isobutyl ketone, ethyl acetate, butyl acetate, diethylene glycol dimethyl ether, xylene, etc. are preferable.

The weight of the solvent used in not particularly limited, though usually, it is preferably about 1 to about 5 times, more preferably about 1 to about 3.5 times, as heavy as the total weight of the monomers.

As the radical polymerization catalyst, there can be used initiators usable in ordinary radical polymerization, such as azo compounds, peroxide compounds, etc. Specific examples of the radical polymerization catalyst are 2,2'-azobis(4-methoxy-2,4-dimethylvaleronitrile), 2,2'-azobis(cyclopropylpropionitrile), 2,2'-azobis(2,4-dimethylvaleronitrile), 2,2'-azobis (isobutyronitrile), 2,2'-azobis(2-methylbutyronitrile), 1,1'-azobis(cyclohexane-1-carbonitrile), 2-phenylazo-4-methoxy-2,4-dimethylvaleronitrile, benzoyl peroxide, di-tert-butyl peroxybenzoate, etc. Although not particularly limited, the amount of the initiator used is preferably 0.1 to 5 wt %, more preferably 0.2 to 4 wt %, base A the total weight of the monomers.

Although not particularly limited, the number average molecular weight of the resulting polymer is preferably 3,000 to 200,000, more preferably 10,000 to 100,000, from the viewpoint of various characteristics of the coating resin. In the present specification, the number average molecular weight is a value obtained by measurement by gel permeation chromatography and conversion using a standard polystyrene calibration curve.

In the polymerization, a suitable chain transfer agent may be blended for controlling the molecular weight. Specific examples of the chain transfer agent are methanethiol, ethanethiol, propanethiol, isopropanethiol, butanethiol, 2-methylpropanethiol, 3-methylpropanethiol, 1,1-dimethylethanethiol, 1-hexanethiol, 1-octanethiol, 1-decanethiol, benzenethiol, 2-methylbenzenethiol, 3-methylbenzenethiol, 4-methylbenzenethiol, methylbenzenethiol, 2-ethylbenzenethiol, 3-ethylbenzenethiol, 4-ethylbenzenethiol, bis(4-hydroxydimethylphenyl) disulfide, bis(2-chloromethylphenyl) disulfide, bis(2-bromomethylphenyl) disulfide, dinaphthyl disulfide, di-2benzothia disulfide, a-methylstyrene dimer, carbon tetrachloride, carbon tetrabromide, chloroform, etc. The amount of the chain transfer agent blended may be properly chosen depending on the molecular weight of the desired polymer.

The polymerization is carried out in an inert gas atmosphere. The inert gas includes nitrogen, argon, helium, neon, etc.

Although the content of resin solids is not particularly limited in the coating varnish composition of the present invention comprising the polymer (A) produced by the method described above, it is preferably 10 to 90 wt %, more preferably 20 to 80 wt %, from various characteristics of the coating resin.

The coating varnish composition of the present invention preferably contains at least one compound (B) having both a hydrophobic group and a hydrophilic group in the molecule, together with the aforesaid polymer (A).

In the present invention, the compound (B) is added for improving the long-term coating consuming properties. The compound (B) having both a hydrophobic group and a hydrophilic group in the molecule is a compound which is unreactive to acid anhydride groups or carboxyl group and has both a hydrophobic group and a hydrophilic group in the molecule.

As the hydrophobic group, there can be exemplified straight, branched or cyclic alkyl groups having 4 or more carbon atoms, aryl groups, aralkyl groups, etc., which may have one or more substituents, and substituted or unsubstituted hydrocarbon groups having 4 or more carbon atoms which are capable of forming a cyclic compound in combination with the hydrophilic group.

Preferable specific examples of the hydrophobic group are monovalent hydrocarbon groups such as butyl group, isobutyl group, sec-butyl group, tert-butyl group, pentyl group, sec-pentyl group, tert-pentyl group, neopentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, octadecyl group, nonadecyl group, eicosyl group, cyclopropyl group, cyclobutyl group, cyclopentyl group, cyclohexyl group, phenyl group, o-tolyl group, m-tolyl group, p-tolyl group, 2,3-xylyl group, 2,4-xylyl group, o-cumenyl group, m-cumenyl group, p-cumenyl group, mesityl group, benzyl group, phenetyl group, naphthyl group, norbornyl group, etc.; and divalent hydrocarbon groups such as tetramethylene group, pentamethylene group, hexamethylene group, octamethylene group, etc.

Examples of the hydrophilic group are as follows:

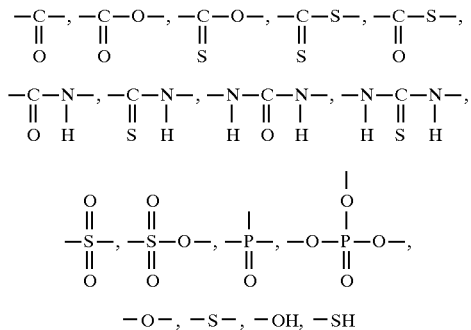

—O—, —S—, —OH, —SH

Specific examples of the compound (B) are alcohols having 12 or more carbon atoms, such as dodecanol, tetradecanol, hexadecanol, octadecanol, triphenylmethanol, etc.; thiols having 12 or more carbon atoms, such as dodecanethiol, tetradecanethiol, hexadecanethiol, octadecanethiol, triphenylmethanethiol, etc.; carboxylic acid esters having 12 or more carbon atoms, such as hexyl hexanoate, heptyl hexanoate, octyl hexanoate, 2-ethylhexyl hexanoate, nonyl hexanoate, decyl hexanoate, butyl octanoate, isobutyl octanoate, sec-butyl octanoate, tert-butyl octanoate, pentyl octanoate, hexyl octanoate, ethyl decanoate, propyl decanoate, isopropyl decanoate, butyl decanoate, isobutyl decanoate, sec-butyl decanoate, tert-butyl decanoate, methyl laurate, ethyl laurate, propyl laurate, isopropyl laurate, butyl laurate, isobutyl laurate, sec-butyl laurate, tert-butyl laurate, methyl myristate, ethyl myristate, propyl myristate, isopropyl myristate, butyl myristate, isobutyl myristate, sec-butyl myristate, tert-butyl myristate, methyl palmitate, ethyl palmitate, propyl palmitate, isopropyl palmitate, butyl palmitate, isobutyl palmitate, sec-butyl palmitate, tert-butyl palmitate, methyl stearate, ethyl stearate, propyl stearate, isopropyl stearate, butyl stearate, isobutyl stearate, sec-butyl stearate, tert-butyl stearate, etc.; phosphoric esters such as trioctyl phosphate, triphenyl phosphate, tricresyl phosphate, etc.; phosphine oxides such as trioctylphosphine oxide, triphenylphosphine oxide, etc.; amides such as benzamide, benzanilide, lauramide, lauranilide, myristamide, myristanilide, palmitamide, palmitanilide, stearamide, stearanilide, ε-caprolactam, etc.; ureas such as phenylureas, diphenylurea, etc.; and thioureas such as phenylthioureas, diphenylthiourea, etc.

Of these, compounds having a melting point of 0° C. or higher, preferably 10° C. or higher, more preferably 20° C. or higher, are preferable because they exhibit little effect of decreasing the strength of a coating film formed from the antifouling paint. Further, methyl myristate, ethyl myristate, methyl palmitate, ethyl palmitate, methyl stearate, ethyl stearate, triphenyl phosphate, tricresyl phosphate, trioctylphosphine oxide, triphenylphosphine oxide, etc. are preferable because of their marked improving effect on the long-term coating consuming properties. Ethyl palmitate, ethyl stearate, tricresyl phosphate, triphenyl phosphate, trioctylphosphine oxide and triphenylphosphine oxide are more preferable.

The above-exemplified compounds (B) having both a hydrophobic group and a hydrophilic group in the molecule can be used singly or in combination of two or more thereof. The amount of the compound(s) (B) used is preferably 1 to 200 wt %, particularly preferably 5 to 50 wt %, based on the weight of the polymer (A) (resin solids). When the amount is less than 1 wt %, the addition of the compound(s) (B) is not sufficiently effective, so that the long-term coating consuming properties tend to be poor. When the amount is more than 200 wt %, the durability of a coating film in the seawater tends to be deteriorated.

In the present invention, it is preferable to further add at least one compound (C) selected from the group consisting of triazole derivatives, thiadiazole derivatives and benzothiazole derivatives because the addition is markedly effective in preventing a viscosity increase caused by mixing with a copper compound used as an antifouling agent.

The triazole derivatives include benzotriazole derivatives, amino-substituted triazole derivatives and other triazole derivatives.

The benzotriazole derivatives include 1,2,3-benzotriazole, 1-methyl-1,2,3-benzotriazole, 1-phenyl-1,2,3,-benzotriazole, 2-phenyl-1,2,3-benzotriazole, 4-chloro-1,2,3-benzotriazole, 4-nitro-1,2,3-benzotriazole, 5-methyl-1,2,3-benzotriazole, 5-ethyl-1,2,3-benzotriazole, 5-propyl-1,2,3-benzotriazole, 5-isobutyl-1,2,3,-benzotriazole, 5-methoxy-1,2,3-benzotriazole, 5-chloro-1,2,3-benzotriazole, 5,6-dimethyl-1,2,3-benzotriazole, 1,2,3-benzotriazolecarboxylic acid and its ester derivatives, and N-dialkylaminomethyl-1,2,3-benzotriazole, etc. The amino-substituted triazole derivatives include 4-amino-1,2,4-triazole, 3-amino-1H-1,2,3-triazole, etc. The other triazole derivatives 20 include, for example, alkyl-, aryl-, aralkyl-, halogen- or hydroxy-substituted triazole derivatives such as 1,2,3-triazole, 1-methyl-1,2,3-triazole, 1-phenyl-1,2,3-triazole, 1-benzyl-1,2,3-triazole, 2-methyl-1,2,3-triazole, 2-phenyl-1,2,3-triazole, 2-benzyl-1,2,3-triazole, 4-methyl-1,2,3-triazole, 4-phenyl-1,2,3-triazole, hydroxy-1,2,3-triazole, 4,5-dimethyl-1,2,3-triazole, 4-methyl-2-phenyl-1,2,3-triazole, 4,5-dimethyl-2-phenyl-1,2,3-triazole, 1,5-diphenyl-1,2,3-triazole, 1,2,4-triazole, 1-methyl-1,2,4-triazole, 1-phenyl-1,2,4-triazole, 3-methyl-1,2,4-triazole, 3-phenyl-1,2,4-triazole, 3-chloro-1,2,4-triazole, 3-bromo-1,2,4-triazole, 3,5-dimethyl-1,2,4-triazole, 3,5-diethyl-1,2,4-triazole, 1,3-diphenyl-1,2,4-triazole, 1,5-diphenyl-1,2,4-triazole, 3,5-diphenyl-1,2,4-triazole, etc.

As the benzothiazole derivatives among the compounds usable as the compound (C), sulfur-substituted benzothiazole derivatives are preferable. Specific examples thereof are 2-mercaptobenzothiazole, dibenzothiazyl disulfide, N-oxydiethylenebenzothiazole-2-sulfenamide, N,N-diisopropylbenzothizole-2-sulfenamide, N,N-dicyclohexylbenzothiazole-2-sulfenamide, 3-(2-benzothiazylthio) propionic acid, (2-benzothiazylthio)acetic acid, etc. As the thiadiazole derivatives, sulfur-substituted thiazole derivatives are preferable. Specific examples thereof are 2-mercapto-1,3,4-thiadiazole, 2,5-dimercapto-1,3,4-thiadiazole, 2-amino-5-mercapto-1,3,4-thiadiazole, 2-methyl-5-mercapto-1,3,4-thiadiazole, 2-methylamino-5-mercapto-1,3,4-thiadiazole, 2-thioaceto-5-mercapto-1,3,4-thiadiazole, etc.

Of the compounds exemplified above as the compound (C), the triazole derivatives are preferable because of their marked effect. Specifically, the compound(s) (C) is preferably selected from the group consisting of 1,2,3-benzotriazole, 1,2,4-triazole and 3-amino-1H-1,2,4-triazole.

The compounds exemplified above as the compound (C) can be used singly or in combination of two or more thereof. The amount of the compound(s) (C) used is preferably not more than 50 wt % and not less than 0.1 wt %, particularly preferably not more than 10 wt % and not less than 0.2 wt %, based on the weight of the polymer (A) used (resin solids). When the amount is less than 0.1 wt %, the addition of the compound(s) (C) is not sufficiently effective, so that a viscosity increase tends to be caused by production of a coating material by mixing with a copper compound used as an antifouling agent. When the amount is more than 50 wt %, it is difficult to form a satisfactory coating film.

Polymers other than the above-mentioned polymer (A) may be incorporated into the coating varnish composition of the present invention so long as they do not lessen the effects of the present invention.

The above-mentioned coating varnish composition can be made into an antifouling coating composition by incorporating thereinto a colorant such as a known pigment, a known antifouling agent and various other additives (bulk filler, dispersion-preventive or anti-sag agent, etc.).

The antifouling agent used in the antifouling coating composition of the present invention is preferably one which is composed mainly of an organic antifouling agent (proportion: 50 wt % or more based on the weight of the whole antifouling agent). The organic antifouling agent includes 2,4,5,6-tetrachloroisophthalonitrile, N,N-dimethyldichlorophenylurea, 4,5-dichloro-2-n-octyl-3(2H)-isothiazolone, zinc dimethyldithiocarbamate, 2-methylthio-4-t-butylamino-6-cyclopropylamino-s-triazine, N-(fluorodichloromethylthio)phthalimide, N,N'-dimethyl-N'-phenyl-(N-fluorodichloro-methylthio)sulfamide, 2-pyridinethiol-1-oxide zinc salt, tetramethylthiuram disulfide, 2,4,6-trichlorophenylmaleimide, 2,3,5,6-tetrachloro-4-(methylsulfonyl)pyridine, 3-iodo-2-propynylbutyl carbamate, diiodomethylparatolysulfone, bis-dimethyldithiocarbamoylzincethylenebis dithiocarbamate, pyridine-triphenylborane, etc.

As inorganic antifouling agents, there can be exemplified cupric chromate, cupric ferrocyanate, cupric quinoline, cupric a-hydroquinone, cupric oleate, cupric nitrate, cupric phosphate, cupric tartarate, cuprous oxide, copper rhodanide, copper-nickel solid solution alloy, cuprous iodide, cuprous sulfite, zinc oxide, zinc chromate, strontium chromate, etc.

Organotin compounds, triazine compounds, organosulfur compounds, etc. may also be used as the antifouling agent.

Although not particularly limited, the amount of the antifouling agent used is preferably 1 to 500 wt %, particularly preferably 50 to 450 wt %, based on the total weight of the polymers (resin solids). When the amount is less than 1 wt %, the antifouling agent is hardly effective. When the amount is more than 500 wt %, it is difficult to form a satisfactory coating film.

Typical examples of the pigment are inorganic pigments such as titanium oxide (titanium white), iron oxide, carbon black, etc.; and organic pigments such as azo, cyanine, phthalocyanine and quinacridone pigments, etc. Usually, the inorganic pigments are used. The above-exemplified pigments are used if necessary. Although not particularly limited, the amount of the pigment used is preferably 200 wt % or less based on the total weight of the polymers (resin solids). When the amount is more than 200 wt %, the stability of a coating film tends to be low.

The bulk filler includes calcium carbonate, barium sulfate, magnesium oxide, alumina, zeolite, etc. These bulk fillers are used if necessary. Although not particularly limited, the amount of the bulk filler is preferably 100 wt % or less based on the total weight of the polymers (resin solids). When the amount is more than 100 wt %, the stability of a coating film tends to be low.

The dispersion-preventive or anti-sag agent includes inorganic ones such as silica gel-, bentonite-, kaolinite-, talc-, hectorite-, montmorillonite-, saponite- or beidellite-based dispersion-preventive or anti-sag agents; and organic ones such as fatty acid amide-, fatty acid ester-, polyethylene oxide- or sulfuric ester-type anionic surfactants, and polycarboxylic acid amine salt-, polycarboxylic acid-, polyamide-, polymeric polyether-, acrylic copolymer- or specific silicon-based dispersion-preventive or anti-sag agents. Although not particularly limited, the amount of the dispersion-preventive or anti-sag agent is preferably 0.01 to 100 wt % based on the total weight of the polymers (resin solids). When the amount is less than 0.01 wt %, the effect of the addition of said agent is hardly sufficient. When the amount is more than 100 wt %, the stability of a coating film tends to be low.

Rosin, gum rosin, wood rosin, tall oil rosin, etc. may be further incorporated as elusion assistant.

The thus obtained antifouling coating composition of the present invention is useful as ship bottom paint, paint for fishing nets, etc.

The present invention is illustrated below with reference to Examples, which are not by way of limitation but by way of illustration. In the following Examples, "coating varnish (composition)" is abbreviated as "varnish (composition)" and "antifouling coating composition" as "coating composition".

PRODUCTION EXAMPLE 1

In a four-necked flask equipped with a stirrer, a condenser, a nitrogen gas inlet tube, a dropping funnel and a thermometer were placed 69.9 g of methyl isobutyl ketone and 14.7 g of maleic anhydride, and the maleic anhydride was dissolved with stirring at room temperature. Then, a mixture of 15.1 g of isobutyl vinyl ether and 0.75 g of 2,2'-azobis(2, 4-dimethylvaleronitrile) was placed in the flask in a nitrogen gas stream, and the resulting mixture was maintained at 60° C. for 4 hours with stirring. Subsequently, a mixture of 8.0 g methyl isobutyl ketone and 0.75 g of 2,2'- azobis-(2,4-dimethylvaleronitrile) was added dropwise over a period of 20 minutes, and the resulting mixture was maintained at 60° C. for another 2 hours, followed by cooling, whereby a varnish having a resin solid content of 30wt. % was produced. The obtained polymer was composed of 50mol % of the constituent units (I) and 50mol % of the constituent units (IV) and had a number average molecular weight of 24,000.

PRODUCTION EXAMPLE 2

In a four-necked flask equipped with a stirrer, a condenser, a nitrogen gas inlet tube and a thermometer were placed 21.2 g of methyl ethyl ketone and 5.88 g of maleic anhydride, and the maleic anhydride was dissolved with stirring at room temperature. Then, 9.38 g of 2-ethylhexyl vinyl ether and 0.298 g of 2,2'- azobis (2,4-dimethylvaleronitrile) were placed in the flask in a nitrogen gas stream, and the resulting mixture was maintained at 60° C. for 6 hours with stirring. Subsequently, 15.0 g of methyl ethyl ketone was added, followed by cooling, whereby a varnish having a resin solid content of 30wt. % was produced. The obtained polymer was composed of 50mol % of the constituent units (I) and 50mol % of the constituent units (IV) and had a number average molecular weight of 50,000.

PRODUCTION EXAMPLE 3

In a four-necked flask equipped with a stirrer, a condenser, a nitrogen gas inlet tube and a thermometer were placed 10.4 g of xylene and 1.96 g of maleic anhydride, and the maleic anhydride was dissolved with stirring at room temperature. Then, 5.96 g of octadecyl vinyl ether and 9.92×10-2 g of 2,2'-azobis (2,4-dimethylvaleronitrile) were placed in the flask in a nitrogen gas stream, and the resulting mixture was maintained at 60° C. for 6 hours with stirring. Subsequently, 7.98 g of xylene was added, followed by cooling, whereby a varnish having a resin solid content of 30wt. % was produced. The obtained polymer was composed of 50mol % of the constituent units (I) and 50mol % of the constituent units (IV) and had a number average molecular weight of 24,000.

PRODUCTION EXAMPLE 4

In a four-necked flask equipped with a stirrer, a condenser, a nitrogen gas inlet tube and a thermometer were placed 12.7 g of ethyl acetate and 2.94 g of maleic anhydride, and the maleic anhydride was dissolved with stirring at room temperature. Then, a mixture of 4.27 g of vinyl hexanoate and 0.150 g of 2,2'-azobis(2,4-dimethylvaleronitrile) was placed in the flask in a nitrogen gas stream, and the resulting mixture was maintained at 60° C. for 4 hours with stirring. Subsequently, 3.58 g of ethyl acetate was added, followed by cooling, whereby a varnish having a resin solid content of 30wt. % was produced. The obtained polymer was composed of 30wt. % of the constituent units (I) and 50mol % of the constituent units (IV) and had a number average molecular weight of 15,000.

PRODUCTION EXAMPLE 5

In a four-necked flask equipped with a stirrer, a condenser, a nitrogen gas inlet tube and a thermometer were placed 9.01 g of methyl ethyl ketone and 2.95 g of maleic anhydride, and the maleic anhydride was dissolved with stirring at room temperature. Then, a mixture of 6.80 g of vinyl laurate and 0.149 g of 2,2'-azobis(2,4-dimethylvaleronitrile) was placed in the flask in a nitrogen gas stream, and the resulting mixture was maintained at 60° C. for 4 hours with stirring. Subsequently, 5.45 g of methyl ethyl ketone was added, followed by cooling, whereby a varnish having a resin solid content of 30wt. % was produced. The obtained polymer was composed of 50mol % of the constituent units (I) and 50mol % of the constituent units (IV) and had a number average molecular weight of 11,000.

PRODUCTION EXAMPLE 6

In a four-necked flask equipped with a stirrer, a condenser, a nitrogen gas inlet tube and a thermometer were placed 10.2 g of xylene and 2.95 g of maleic anhydride, and heated at 60° C. to dissolve the maleic anhydride. Then, a mixture of 9.32 g of vinyl stearate, 0.152 g of 2,2'-azobis(2,4-dimethylvaleronitrile) and 5.03 g of xylene was placed in the flask in a nitrogen gas stream, and the resulting mixture was maintained at 60° C. for 6 hours with stirring. Subsequently, 3.00 g of xylene was added, followed by cooling, whereby a varnish having a resin solid content of 40wt. % was produced. The obtained polymer was composed of 50mol % of the constituent units (I) and 50mol % of the constituent units (IV), and had a number average molecular weight of 23,000.

PRODUCTION EXAMPLE 7

In a four-necked flask equipped with a stirrer, a condenser, a nitrogen gas inlet tube, a dropping funnel and a thermometer were placed 21.9 g of methyl isobutyl ketone and 9.00 g of itaconic anhydride, and maintained at 60° C. with stirring. Then, a mixture of 18.1 g of vinyl laurate and 0.397 g of 2,2'-azobis (2,4-dimethylvaleronitrile) was added dropwise with stirring in a nitrogen gas stream over a period of 1.5 hours, and the resulting mixture was maintained at 60° C. for 4 hours. Subsequently, 42.0 g methyl isobutyl ketone was added, followed by cooling, whereby a varnish having a resin solid content of 30wt. % was produced. The obtained polymer was composed of 50mol % of the constituent units (II) and 50mol % of the constituent units (IV) and had a number average molecular weight of 12,000.

PRODUCTION EXAMPLE 8

In a four-necked flask equipped with a stirrer, a condenser, a nitrogen gas inlet tube and a thermometer were placed 20.2 g of xylene and 4.48 g of itaconic anhydride, and the itaconic anhydride was dissolved with stirring at room temperature. Then, a mixture of 11.9 g of octadecyl vinyl ether and 0.198 g of 2,2'-azobis(2,4-dimethylvaleronitrile) was placed in the flask in a nitrogen gas stream, and the resulting mixture was maintained at 60° C. for 6 hours with stirring. Subsequently, 18.4 g of xylene was added, followed by cooling, whereby a varnish having a resin solid content of 30wt. % was produced. The obtained polymer was composed of 50mol % of the constituent units (II) and 50mol % of the constituent units (IV) and had a number average molecular weight of 21,000.

PRODUCTION EXAMPLE 9

In a four-necked flask equipped with a stirrer, a condenser, a nitrogen gas inlet tube, a dropping funnel and a thermometer were placed 69.9 g of methyl isobutyl ketone and 14.7 g of maleic anhydride, and the maleic anhydride was dissolved with stirring at room temperature. Then, a mixture of 15.1 g of isobutyl vinyl ether and 0.75 g of 2,2'-azobis(2,4-dimethyl-valeronitrile) was placed in the flask in a nitrogen gas stream, and the resulting mixture was maintained at 60° C. for 4 hours with stirring. Subsequently, a mixture of 8.0 g of methyl isobutyl ketone and 0.75 g of 2,2'-azobis (2,4-dimethylvaleronitrile) was added dropwise over a period of 20 minutes, and the resulting mixture was maintained at 60° C. for 2 hours to obtain a polymer having a number average molecular weight of 24,000.

In a 1-liter eggplant type flask equipped with a condenser and a drying tube was placed 5.0 g of the aforesaid polymer, followed by adding thereto 200 ml of n-butanol, and the resulting mixture was maintained at 60° C. for 1 hour with stirring. Thereafter, the mixture was maintained at 120° C. for 6 hours with stirring and then distilled under reduced pressure to remove the n-butanol, and the reaction product was recovered from methanol by reprecipitation using tetrahydrofuran as a solvent. The thus obtained polymer was composed of 40mol % of the constituent units (III) and 51mol % of the constituent units (IV). A varnish having a resin solid content of 30wt. % was produced by dissolving 4.5 g of the obtained polymer in 10.5 g of methyl isobutyl ketone.

PRODUCTION EXAMPLE 10

In a four-necked flask equipped with a stirrer, a condenser, a nitrogen gas inlet tube and a thermometer were placed 12.7 g of ethyl acetate and 2.94 g of maleic anhydride, and the maleic anhydride was dissolved with stirring at room temperature. Then, a mixture of 4.27 g of vinyl hexanoate and 0.150 g of 2,2'-azobis(2,4-dimethylvaleronitrile) was placed in the flask in a nitrogen gas stream, and the resulting mixture was maintained at 60° C. for 4 hours with stirring to obtain a polymer having a number average molecular weight of 15,000.

In a 1-liter eggplant type flask equipped with a condenser and a drying tube was placed 5.0 g of the aforesaid polymer, followed by adding thereto 200 ml of n-butanol, and the resulting mixture was maintained at 60° C. for 1 hour with stirring. Thereafter, the mixture was maintained at 120° C. for 6 hours with stirring and then distilled under reduced pressure to remove the n-butanol, and the reaction product was recovered from methanol by reprecipitation using tetrahydrofuran as a solvent. The thus obtained polymer was composed of 50mol % of the constituent units (III) and 50mol % of the constituent units (IV). A varnish having a resin solid content of 30wt. % was produced by dissolving 4.5 g of the obtained polymer in 10.5 g of methyl isobutyl ketone.

PRODUCTION EXAMPLE 11

In a four-necked flask equipped with a stirrer, a condenser, a nitrogen gas inlet tube and a thermometer were placed 9.92 g of methyl ethyl ketone and 5.17 g of monobutyl maleate, and the monobutyl maleate was dissolved with stirring at room temperature. Then, a mixture of 3.00 g of isobutyl vinyl ether and 0.149 g of 2,2'-azobis(2,4-dimethylvaleronitrile) was placed in the flask in a nitrogen gas stream, and the resulting mixture was maintained at 60° C. for 4 hours with stirring. Subsequently, 5.45 g of methyl ethyl ketone was added, followed by cooling, whereby a varnish having a resin solid content of 30wt. % was produced. The obtained polymer had a number average molecular weight of 18,000 and was composed of 50mol % of the constituent units (III) and 50mol % of the constituent units (IV).

PRODUCTION EXAMPLE 12

In a four-necked flask equipped with a stirrer, a condenser, a nitrogen gas inlet tube and a thermometer were placed 6.78 g of methyl ethyl ketone and 5.17 g of monobutyl fumarate, and the monobutyl fumarate was dissolved with stirring at room temperature. Then, a mixture of 6.80 g of vinyl laurate and 0.149 g of 2,2'-azobis(2,4-dimethylvaleronitrile) was placed in the flask in a nitrogen gas stream, and the resulting mixture was maintained at 60° C. for 4 hours with stirring. Subsequently, 5.45 g of methyl ethyl ketone was added, followed by cooling, whereby a varnish having a resin solid content of 30wt. % was produced. The obtained polymer had a number average molecular weight of 16,000 and was composed of 48mol % of the constituent units (III) and 52mol % of the constituent units (IV).

Examples 1 to 12

Varnish compositions were produced by adding tricresyl phosphate to each of the varnishes produced in Production Examples 1 to 12, in an amount of 0.5 g per 5.0 g of resin solids of the varnish, followed by thorough mixing.

Examples 13 to 24

Varnish compositions were produced by adding tricresyl phosphate and 1,2,3-benzotriazole to each of the varnishes produced in Production Examples 1 to 12, in amounts of 0.5 g and 0.05 g, respectively, per 5.0 g of resin solids of the varnish, followed by thorough mixing.

Examples 25 to 36

With each of the varnish compositions produced in Production Examples 1 to 12 were blended 4,5-dichloro-2-n-octyl-3(2H)-isothizoline, calcium carbonate, red iron oxide (iron(III) oxide), FLOWNON SP-1000 (mfd. by Kyoeisha Chemical Co., Ltd.) as dispersion-preventive and anti-sag agent, and a varnish solvent in amounts of 50 g, 10 g, 5 g, 1 g and 4 g, respectively, per 15 g of resin solids of the varnish composition. Glass beads (diameter: 2 mm) were added to the resulting blend, followed by kneading and stirring by means of a mechanical stirrer, and the glass beads were filtered off. Thus, coating compositions were prepared.

Examples 37 and 38

With each of the varnish compositions produced in Examples 2 and 10 were blended 2,4,5,6-tetrachloroisophthalonitrile, calcium carbonate, red iron oxide (iron(III) oxide), FLOWNON SP-1000 (mfd. by Kyoeisha Chemical Co., Ltd.) as dispersion-preventive and anti-sag agent, and a varnish solvent in amounts of 50 g, 10 g, 5 g, 1 g and 4 g, respectively, per 15 g of resin solids of the varnish composition. Glass beads (diameter: 2 mm) were added to the resulting blend, followed by kneading and stirring by means of a mechanical stirrer, and the glass beads were filtered off. Thus, coating compositions were prepared.

Examples 39 and 40

With each of the varnish compositions produced in Examples 2 and 10 were blended pyridine-triphenyl-borane, calcium carbonate, red iron oxide (iron(III) oxide), FLOWNON SP-1000 (mfd. by Kyoeisha Chemical Co., Ltd.) as dispersion-preventive and anti-sag agent, and a varnish solvent in amounts of 50 g, 10 g, 5 g, 1 g and 4 g, respectively, per 15 g of resin solids of the varnish composition. Glass beads (diameter: 2 mm) were added to the resulting blend, followed by kneading and stirring by means of a mechanical stirrer, and the glass beads were filtered off. Thus, coating compositions were prepared.

Examples 41 to 52

With each of the varnish compositions produced in Examples 13 to 24 were blended cuprous oxide (powder; purity 90% or more), calcium carbonate, red iron oxide (iron(III) oxide), FLOWNON SP-1000 (mfd. by Kyoeisha Chemical Co., Ltd.) as dispersion-preventive and anti-sag agent, 4,5-dichloro-2-n-octyl-4-isothiazolin-3-one and a varnish solvent in amounts of 45 g, 10 g, 5 g, 1 g, 5 g and 4 g, respectively, per 15 g of resin solids of the varnish composition. Glass beads (diameter: 2 mm) were added to the resulting blend, followed by kneading and stirring by means of a mechanical stirrer, and the glass beads were filtered off. Thus, coating compositions were prepared.

Examples 53 to 64

The polymer was isolated from each of the varnishes produced in Production Examples 1 to 12.

PRODUCTION EXAMPLE 13

According to the process described in Yukagaku, Vol. 34, p. 456 (1985), 9.8 g of maleic anhydride, 8.6 g of vinyl acetate and 43 g of acetone were placed in a four-necked flask equipped with a stirrer, a nitrogen gas inlet tube and a thermometer, and 0.456 g of 2,2'-azobis(isobutyronitrile) was added as a polymerization catalyst. The resulting mixture was stirred with heating at 56° C. for 4 hours to carry out polymerization, after which the mixture was cooled to produce a varnish having a resin solid content of 30wt. %. The number average molecular weight of the polymer was 6,000.

PRODUCTION EXAMPLE 14

According to the process disclosed in JP-A-6-41284, 10.1 g of maleic anhydride was placed in a four-necked flask equipped with a stirrer, a condenser, a nitrogen gas inlet tube and a thermometer, and the air in the reactor was thoroughly replaced with nitrogen. Then, 14.8 g of n-butyraldehyde, 14.8 g of methyl isobutyl ketone and 7.2 g of methyl vinyl ether were placed in the flask and stirred for about 15 minutes until the maleic anhydride was completely dissolved. The resulting mixture was heated at 60° C. and 6 ml of an initiator solution consisting of 0.2 g of lauroyl peroxide and 20 g of n-butyraldehyde was added. The thus obtained mixture was stirred with heating for 5 hours to carry out polymerization, followed by cooling, whereby a varnish having resin solid content of 33wt. % was produced. The number average molecular weight of the polymer was 38,000.

PRODUCTION EXAMPLE 15

According to the process disclosed in Japanese Patent Application Kohyo No. 60-500452, 114.6 g of 2,2,2-trifluoroethyl methacrylate, 14.6 g of methyl methacrylate, 20.8 g of butyl acrylate and 150 g of xylene were charged into a 500-ml flask equipped with a thermometer and a stirrer, followed by adding thereto 1.5 g of 2,2'-azobis (isobutyronitrile) as polymerization catalyst, and the resulting mixture was heated at 80° C. for 1 hour. Polymerization was carried out at 80° C. for another 6 hours, followed by cooling, whereby a varnish was produced. The number average molecular weight of the polymer was 11,000.

PRODUCTION EXAMPLE 16

According to the process disclosed in JP-A-2-99567, 9.00 g of itaconic anhydride, 9.13 g of vinyl acetate, 7.80 g of methyl isobutyl ketone and 0.362 g of benzoyl peroxide were placed in a four-necked flask equipped with a stirrer, a condenser, a nitrogen gas inlet tube and a thermometer, and the reaction was carried out with stirring at 90° C. for 3 hours. Then, 0.181 g of benzoyl peroxide and 19.4 g of methyl isobutyl ketone were added to the reaction mixture and the resulting mixture was subjected to reaction with stirring at 90° C. for 2 hours to produce a varnish having a resin solid content of 40wt. %. The number average molecular weight of the polymer was 12,000.

PRODUCTION EXAMPLE 17

According to the process disclosed in Japanese Patent Application Kohyo No. 60-500452, 114.6 g of 2,2,2-trifluoroethyl acrylate, 14.6 g of methyl methacrylate, 20.8 g of butyl acrylate and 150 g of xylene were charged into a 500-ml flask equipped with a thermometer and a stirrer, followed by adding thereto 1.5 g of 2,2'-azobis (isobutyronitrile) as polymerization catalyst, and the resulting mixture was heated at 80° C. for 1 hour. Polymerization was carried out at 80° C. for another 6 hours, followed by cooling, whereby a varnish was produced. The number average molecular weight of the polymer was 11,000.

PRODUCTION EXAMPLE 18

According to the process disclosed in Japanese Patent Application Kohyo No. 60-500452, 118.2 g of p-nitrophenyl acrylate, 13.1 g of methyl methacrylate, 18.6 g of butyl acrylate and 150 g of xylene were charged into a 500-ml flask equipped with a thermometer and a stirrer, followed by adding thereto 1.5 g of 2,2'-azobis(isobutyronitrile) as polymerization catalyst, and the resulting mixture was heated at 80° C. for 1 hour. Polymerization was carried out at 80° C. for another 6 hours, followed by cooling, whereby a varnish was produced. The number average molecular weight of the polymer was 12,300.

COMPARATIVE EXAMPLE 1 to 3

Varnish compositions were produced by adding tricresyl phosphate to each of the varnishes produced in Production Examples 13, 14 and 15, in an amount of 0.5 g per 5.0 g of resin solids of the varnish, followed by thorough mixing. Then, pyridine-triphenylborane, calcium carbonate, red iron oxide (iron(III) oxide), FLOWNON SP-1000 (mfd. by Kyoeisha Chemical Co., Ltd.) as dispersion-preventive and anti-sag agent, and a varnish solvent were blended with each varnish composition in amounts of 50 g, 10 g, 5 g, 1 g and 4 g, respectively, per 15 g of resin solids of the varnish composition. Glass beads (diameter: 2 mm) were added to the resulting blend, followed by kneading and stirring by means of a mechanical stirrer, and the glass beads were filtered off. Thus, coating compositions were prepared.

COMPARATIVE EXAMPLE 4 to 8

With each of the varnishes produced in Production Examples 13 to 17 were blended cuprous oxide (powder; purity 90% or more), calcium carbonate, red iron oxide (iron(III) oxide), FLOWNON SP-1000 (mfd. by Kyoeisha Chemical Co., Ltd.) as dispersion-preventive and anti-sag agent, 4,5-dichloro-2-n-octyl-4-isothiazolin-3-one and a varnish solvent in amounts of 45 g, 10 g, 5 g, 1 g, 5 g and 4 g, respectively, per 15 g of resin solids of the varnish. Glass beads (diameter: 2 mm) were added to the resulting blend, followed by kneading and stirring by means of a mechanical stirrer, and the glass beads were filtered off. Thus, coating compositions were prepared.

COMPARATIVE EXAMPLE 9 to 11

With each of the varnishes produced in Production Examples 13 to 15 were blended pyridine-triphenylborane, calcium carbonate, red iron oxide (iron(III) oxide), FLOWNON SP-1000 (mfd. by Kyoeisha Chemical Co., Ltd.) as dispersion-preventive and anti-sag agent, 4,5-dichloro-2-n-octyl-4-isothiazolin-3-one and a varnish solvent in amounts of 45 g, 10 g, 5 g, 1 g, 5 g and 4 g, respectively, per 15 g of resin solids of the varnish. Glass beads (diameter: 2 mm) were added to the resulting blend, followed by kneading and stirring by means of a mechanical stirrer, and the glass beads were filtered off. Thus, coating compositions were prepared.

COMPARATIVE EXAMPLE 12 to 16

The polymer was isolated from each of the varnishes produced in Production Examples 13 to 17.
Coating Composition Preparation Test The coating compositions prepared in Examples 25 to 36 and Comparative Examples 1 to 3 were allowed to stand overnight at room temperature after the preparation, and then the condition of each composition was observed. The composition which maintained a very smooth condition and contained well dispersed materials for the composition was rated as (marked by) ○. The composition which contained insolubles left or was in a separated state because of insufficient dispersion of materials for the composition was rated as (marked by) x. Further, a coating film was formed on an FRP plate by use of each coating composition and air-dried overnight at room temperature. The condition of the air-dried coating film was observed. A coating film with a very smooth surface was rated as (marked by) ○, and a coating film bearing a non-smooth surface with graininess was rated as (marked by) x. The results obtained are shown in Table 1.

As is clear from the above experiment, the coating compositions of the present invention showed excellent dispersion of a colorant, an antifouling agent and various other additives and could give a very smooth coating film. On the other hand, in the case of the coating compositions of Comparative Examples 1 and 2, the dispersibility of a colorant, an antifouling agent and various other additives was not sufficient at the time of preparation of the composition, so that insolubles remained in the composition or that the composition was separated. Therefore, the coating film obtained from each of these coating compositions was poor in surface smoothness. Thus, these compositions were found to be unsuitable as an antifouling paint.

Storage Stability Test

The coating compositions prepared in Examples 25 to 36, Examples 41 to 52 and Comparative Examples 4 to 6 were stored overnight at room temperature after the preparation. Then, the condition of each composition was observed and its viscosity was measured at 25° C. Each coating composition was stored for 20 days in a tightly stoppered sample bottle placed in a 40° C. thermostat. After the storage, the condition of the composition was observed and its viscosity was measured at 25° C. The results obtained are shown in Tables 2 and 3.

From the experimental results, the following was found: all of the coating compositions of the present invention (Examples 25 to 36 and Examples 41 to 52) slightly increased in viscosity, namely, they were excellent in storage stability, but the coating compositions of Comparative Examples 4 to 6 were unsuitable as an antifouling paint because they increased markedly in viscosity.

Coating Consuming Test

The coating compositions prepared in Examples 25 to 36, Examples 41 to 52 and Comparative Examples 4 to 11 were allowed to stand overnight at room temperature after the preparation. Then, using each coating composition, a coating film was formed on one side of an FRP plate so as to adjust the dry coating thickness to 150 μm, and the coating film was air-dried overnight at room temperature. The FRP plate having the coating film was attached to a disk rotor and rotated at a constant speed (peripheral speed: approx. 15 knots) for 10 months in the seawater (water temperature: 15°±2° C.). Thereafter, the surface of the coating film was observed and its thickness change was measured. The results obtained are shown in Tables 4 and 5.

As is clear from the experimental results, in the case of the coating compositions of the present invention (Examples 25 to 36 and Examples 41 to 52), the consuming properties of the coating film lasted for a long period of time. Thus, these compositions were found to be very useful as antifouling paint.

By contrast, in the case of the coating compositions prepared in Comparative Examples 4 to 8, the consuming properties of the coating film was very poor. On the other hand, in the case of the coating compositions prepared in Comparative Examples 9 to 11, the consuming properties of the coating film was too high, so that the whole coating film was dissolved within one month. Thus, these compositions were found to be unsuitable as antifouling paint.

Antifouling Performance Test

Each of the coating compositions of Examples 25 to 40 and Comparative Examples 4 to 8 was spray-coated twice on both sides of a steel plate (100×200× 1 mm) previously coated with an anticorrosive coating, so as to adjust the dry coating thickness on each side to 100 μm. The thus treated steel plate was air-dried overnight at room temperature to prepare a test plate.

The test plate was fixed to a raft set in Hitachi Port in Hitachi City, Ibaragi Pref., and immersed in the seawater. The number of the marine organisms (barnacles) attached to the test plate was counted periodically. The results obtained are shown in Tables 6 and 7.

As is clear from the experimental results, all of the coating compositions of the present invention were superior in antifouling performance to the coating compositions of the Comparative Examples, namely, the number of the marine organism attached to the test plate was small in the case of the coating compositions of the present invention.

Biodegradability Test

Using each of the polymer isolated in Examples 53 to 64 and Comparative Examples 12 to 16, biochemical oxygen demand (BOD5) was measured according to JIS K0102, and biodegradation rate (%) was calculated from the ratio of BOD5 to theoretical oxygen demand (ThOD). In this case, BOD5 was measured by diluting a sample solution (1000 ppm) with water, allowing the dilution to stand at 20° C. for 5 days, and measuring the amount of dissolved oxygen consumed by the above treatment. As ThOD, the amount of oxygen consumed by complete oxidation of a sample was obtained by calculation. The biodegradation rate (%) was calculated by the following equation. The results obtained are shown in Table 8.

$$\text{Biodegradation rate (\%)} = \frac{BOD_5}{ThOD} \times 100$$

As is clear from the experimental results, the polymers contained in the coating compositions of the present invention were substantially equal in biodegradability to the polymers of Comparative Examples 12, 13 and 14, but were superior in biodegradability to the polymers of Comparative Examples 15 and 16.

The coating varnish compositions and the antifouling coating compositions according to the present invention have no poisonous action unlike the organotin copolymers, have no undesirable influence on the ecosystems because of their biodegradation by microorganisms after dissolution in the seawater, and are capable of forming a coating film which can maintain excellent antifouling performance for a long period of time.

TABLE 1

| Coating composition | Varnish composition | Condition of paint | Condition of coating |
|---|---|---|---|
| Example 25 | Example 1 | ○ | ○ |
| Example 26 | Example 2 | ○ | ○ |
| Example 27 | Example 3 | ○ | ○ |
| Example 28 | Example 4 | ○ | ○ |
| Example 29 | Example 5 | ○ | ○ |
| Example 30 | Example 6 | ○ | ○ |
| Example 31 | Example 7 | ○ | ○ |
| Example 32 | Example 8 | ○ | ○ |
| Example 33 | Example 9 | ○ | ○ |
| Example 34 | Example 10 | ○ | ○ |
| Example 35 | Example 11 | ○ | ○ |
| Example 36 | Example 12 | ○ | ○ |
| Comparative Example 1 | Production Example 13 | x | x |
| Comparative | Production | x | x |

TABLE 1-continued

| Coating composition | Varnish composition | Condition of paint | Condition of coating |
|---|---|---|---|
| Example 2 Comparative Example 3 | Example 14 Production Example 15 | x | x |

TABLE 2

| Coating composition | Varnish composition | Change of viscosity with time (Pa · s) 0 day | 20 days |
|---|---|---|---|
| Example 25 | Example 1 | 2.4 | 2.8 |
| Example 26 | Example 2 | 2.6 | 2.8 |
| Example 27 | Example 3 | 2.6 | 3.0 |
| Example 28 | Example 4 | 1.0 | 1.2 |
| Example 29 | Example 5 | 1.0 | 1.3 |
| Example 30 | Example 6 | 1.1 | 1.5 |
| Example 31 | Example 7 | 1.8 | 2.3 |
| Example 32 | Example 8 | 2.5 | 2.9 |
| Example 33 | Example 9 | 2.1 | 2.6 |
| Example 34 | Example 10 | 2.0 | 2.3 |
| Example 35 | Example 11 | 1.8 | 2.2 |
| Example 36 | Example 12 | 1.8 | 2.0 |

TABLE 3

| Coating composition | Varnish composition | Change of viscosity with time (Pa · s) 0 day | 20 days |
|---|---|---|---|
| Example 41 | Example 13 | 2.6 | 3.7 |
| Example 42 | Example 14 | 2.6 | 3.5 |
| Example 43 | Example 15 | 3.1 | 4.3 |
| Example 44 | Example 16 | 1.2 | 2.2 |
| Example 45 | Example 17 | 1.3 | 2.4 |
| Example 46 | Example 18 | 1.6 | 2.5 |
| Example 47 | Example 19 | 2.5 | 2.7 |
| Example 48 | Example 20 | 2.8 | 4.1 |
| Example 49 | Example 21 | 2.3 | 3.1 |
| Example 50 | Example 22 | 2.7 | 3.2 |
| Example 51 | Example 23 | 2.1 | 3.0 |
| Example 52 | Example 24 | 1.9 | 2.5 |
| Comparative Example 4 | Production Example 13 | 2.0 | 50.6 |
| Comparative Example 5 | Production Example 14 | 2.6 | 58.9 |
| Comparative Example 6 | Production Example 15 | 4.0 | 58.4 |

TABLE 4

| Coating composition | Varnish composition | Coating thickness worm out (μm/month) | | | |
|---|---|---|---|---|---|
| | | 0~1 month | 3~4 months | 6~7 months | 9~10 months |
| Example 25 | Example 1 | 10 | 14 | 14 | 14 |
| Example 26 | Example 2 | 9 | 12 | 13 | 13 |
| Example 27 | Example 3 | 9 | 12 | 12 | 12 |
| Example 28 | Example 4 | 12 | 14 | 14 | 16 |
| Example 29 | Example 5 | 10 | 13 | 14 | 16 |
| Example 30 | Example 6 | 10 | 10 | 9 | 10 |
| Example 31 | Example 7 | 12 | 12 | 14 | 14 |
| Example 32 | Example 8 | 12 | 13 | 14 | 14 |
| Example 33 | Example 9 | 12 | 14 | 15 | 16 |
| Example 34 | Example 10 | 13 | 14 | 14 | 15 |
| Example 35 | Example 11 | 12 | 14 | 14 | 14 |

TABLE 4-continued

| Coating composition | Varnish composition | Coating thickness worm out (μm/month) | | | |
|---|---|---|---|---|---|
| | | 0~1 month | 3~4 months | 6~7 months | 9~10 months |
| Example 36 | Example 12 | 13 | 13 | 13 | 13 |
| Example 41 | Example 13 | 8 | 10 | 10 | 9 |
| Example 42 | Example 14 | 8 | 10 | 10 | 10 |
| Example 43 | Example 15 | 7 | 9 | 8 | 8 |
| Example 44 | Example 16 | 10 | 10 | 11 | 11 |

TABLE 5

| Coating composition | Varnish composition | Coating thickness worm out (μm/month) | | | |
|---|---|---|---|---|---|
| | | 0~1 month | 3~4 months | 6~7 months | 9~10 months |
| Example 45 | Example 17 | 8 | 10 | 12 | 12 |
| Example 46 | Example 18 | 8 | 8 | 8 | 8 |
| Example 47 | Example 19 | 10 | 11 | 11 | 11 |
| Example 48 | Example 20 | 8 | 10 | 9 | 10 |
| Example 49 | Example 21 | 8 | 10 | 10 | 9 |
| Example 50 | Example 22 | 9 | 11 | 12 | 11 |
| Example 51 | Example 23 | 7 | 9 | 8 | 8 |
| Example 52 | Example 24 | 10 | 9 | 8 | 8 |
| Comparative Example 4 | Production Example 13 | 0 | 0 | 0 | 0 |
| Comparative Example 5 | Production Example 14 | 0 | 0 | 0 | 0 |
| Comparative Example 6 | Production Example 15 | 0 | 0 | 0 | 0 |
| Comparative Example 7 | Production Example 16 | 1 | 1 | 1 | 1 |
| Comparative Example 8 | Production Example 17 | 1 | 2 | 1 | 1 |
| Comparative Example 9 | Production Example 13 | Wholly dissolved | | | |
| Comparative Example 10 | Production Example 14 | Wholly dissolved | | | |
| Comparative Example 11 | Production Example 15 | Wholly dissolved | | | |

TABLE 6

| Coating composition | Varnish composition | Antifouling performance (Number of barnacles attached to test plate) | | | | |
|---|---|---|---|---|---|---|
| | | 0 month | 3 months | 6 months | 9 months | 12 months |
| Example 25 | Example 1 | 0 | 0 | 2 | 6 | 10 |
| Example 26 | Example 2 | 0 | 0 | 2 | 5 | 7 |
| Example 27 | Example 3 | 0 | 0 | 5 | 7 | 10 |
| Example 28 | Example 4 | 0 | 0 | 1 | 4 | 8 |
| Example 29 | Example 5 | 0 | 0 | 2 | 3 | 7 |
| Example 30 | Example 6 | 0 | 0 | 5 | 9 | 13 |
| Example 31 | Example 7 | 0 | 3 | 10 | 16 | 22 |
| Example 32 | Example 8 | 0 | 2 | 8 | 14 | 20 |
| Example 33 | Example 9 | 0 | 1 | 5 | 10 | 16 |
| Example 34 | Example 10 | 0 | 1 | 5 | 9 | 16 |
| Example 35 | Example 11 | 0 | 0 | 3 | 8 | 12 |
| Example 36 | Example 12 | 0 | 0 | 2 | 10 | 17 |
| Example 37 | Example 2 | 0 | 2 | 7 | 14 | 23 |
| Example 38 | Example 10 | 0 | 2 | 6 | 12 | 20 |

TABLE 6-continued

| Coating composition | Varnish composition | Antifouling performance (Number of barnacles attached to test plate) | | | | |
|---|---|---|---|---|---|---|
| | | 0 month | 3 months | 6 months | 9 months | 12 months |
| Example 39 | Example 2 | 0 | 3 | 11 | 20 | 28 |
| Example 40 | Example 10 | 0 | 4 | 12 | 20 | 29 |

TABLE 7

| Coating composition | Varnish composition | Antifouling performance (Number of barnacles attached to test plate) | | | | |
|---|---|---|---|---|---|---|
| | | 0 month | 3 months | 6 months | 9 months | 12 months |
| Example 41 | Example 13 | 0 | 0 | 0 | 1 | 2 |
| Example 42 | Example 14 | 0 | 0 | 0 | 1 | 1 |
| Example 43 | Example 15 | 0 | 0 | 0 | 1 | 1 |
| Example 44 | Example 16 | 0 | 0 | 0 | 1 | 1 |
| Example 45 | Example 17 | 0 | 0 | 1 | 2 | 2 |
| Example 46 | Example 18 | 0 | 0 | 0 | 1 | 1 |
| Example 47 | Example 19 | 0 | 0 | 0 | 1 | 2 |
| Example 48 | Example 20 | 0 | 0 | 1 | 2 | 2 |
| Example 49 | Example 21 | 0 | 0 | 0 | 1 | 2 |
| Example 50 | Example 22 | 0 | 0 | 1 | 1 | 2 |
| Example 51 | Example 23 | 0 | 0 | 0 | 1 | 2 |
| Example 52 | Example 24 | 0 | 0 | 1 | 1 | 2 |
| Comparative Example 4 | Production Example 13 | 0 | 43 | 57 | 95 | 160 |
| Comparative Example 5 | Production Example 14 | 0 | 26 | 42 | 61 | 130 |
| Comparative Example 6 | Production Example 15 | 0 | 41 | 58 | 88 | 139 |
| Comparative Example 7 | Production Example 16 | 0 | 32 | 35 | 78 | 123 |
| Comparative Example 8 | Production Example 17 | 0 | 34 | 46 | 75 | 143 |

TABLE 8

| Polymer | Varnish composition | Biodegradation rate (%) |
|---|---|---|
| Example 53 | Production Example 1 | 9.34 |
| Example 54 | Production Example 2 | 9.54 |
| Example 55 | Production Example 3 | 7.28 |
| Example 56 | Production Example 4 | 9.73 |
| Example 57 | Production Example 5 | 8.26 |
| Example 58 | Production Example 6 | 6.88 |
| Example 59 | Production Example 7 | 9.34 |
| Example 60 | Production Example 8 | 11.4 |
| Example 61 | Production Example 9 | 9.89 |
| Example 62 | Production Example 10 | 11.9 |
| Example 63 | Production Example 11 | 10.2 |
| Example 64 | Production Example 12 | 8.81 |
| Comparative Example 12 | Production Example 13 | 9.92 |
| Comparative Example 13 | Production Example 14 | 9.73 |
| Comparative Example 14 | Production Example 15 | 8.98 |
| Comparative Example 15 | Production Example 16 | 0.85 |
| Comparative Example 16 | Production Example 17 | 0.73 |

What is claimed is:

1. An antifouling coating composition comprising
(i) a biodegradable polymer (A) comprising at least one constituent unit (a) represented by the formula:

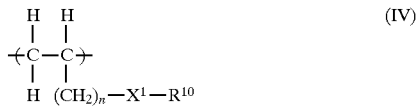

$$\begin{array}{c} H \quad H \\ | \quad\quad | \\ -(C-C)- \\ | \quad\quad | \\ H \quad (CH_2)_n-X^1-R^{10} \end{array} \quad (IV)$$

wherein n is zero or 1; $X^1$ is an oxygen atom, a sulfur atom or —NH—; and $R^{10}$ is a straight, branched or cyclic alkyl group, an aryl group, a heterocyclic group, an aralkyl group or an acyl group, $R^{10}$ being able to be substituted with an alkoxycarbonyl group, and at least one constituent unit (b) selected from the group consisting of formulae (I), (II) and (III):

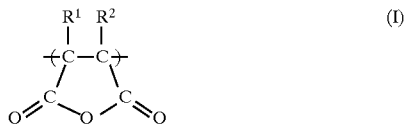

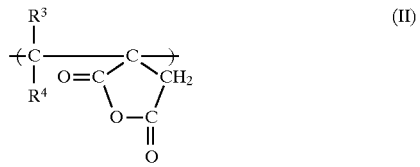

wherein in the formula (I), $R^1$ and $R^2$ are independently a hydrogen atom, a chlorine atom, a bromine atom, a methyl group, an ethyl group or a phenyl group; in the formula (II), $R^3$ and $R^4$ are independently a hydrogen atom, a chlorine atom, a bromine atom, or a substituted or unsubstituted methyl or ethyl group; and in the formula (III), $R^5$ and $R^6$ are independently a hydrogen atom, a methyl group or an ethyl group, and $R^7$ is a straight, branched or cyclic alkyl group, an aryl group, a heterocyclic group or an aralkyl group, which may have one or more substituents, and provided that when a constituent unit represented by formula (I) is a constituent unit of the polymer (A), in formula (IV) there is excluded the case where n is zero, $X^1$ is an oxygen atom and $R^{10}$ is an alkyl group having 1 or 2 carbon atoms or an acyl group having 1 to 5 carbon atoms, and (ii) an antifouling agent.

2. An antifouling coating composition according to claim 1, which further comprises at least one member selected from the group consisting of (iii) a compound (B) having both a hydrophobic group and a hydrophilic group in the molecule and a melting point of 0° C. or higher, and (iv) a compound (C) selected from the group consisting of triazole derivatives, thiadiazole derivatives and benzothiazole derivatives.

3. An antifouling coating composition according to claim 1 or 2, wherein the at least one constituent unit (a) is represented by the formula:

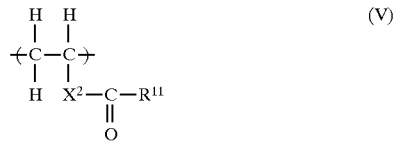 (V)

wherein $X^2$ is an oxygen atom or a sulfur atom; and $R^{11}$ is a hydrogen atom, a straight, branched or cyclic alkyl group, an aryl group, a heterocyclic group or an aralkyl group, provided that when a constituent unit represented by formula (I) is a constituent unit of the polymer (A) there is excluded the case where $X^2$ is an oxygen atom and $R^{11}$ is a hydrogen atom or an alkyl group having 1 to 4 carbon atoms.

4. An antifouling coating composition according to claim 1 or 2, wherein the at least one constituent unit (a) is represented by the formula:

 (VI)

wherein $X^3$ is an oxygen atom or a sulfur atom; and $R^{12}$ is a straight, branched or cyclic alkyl group, an aryl group, a heterocyclic group or an aralkyl group, provided that when a constituent unit represented by formula (I) is a constituent unit of polymer (A), there is excluded the case where $X^3$ is an oxygen atom and $R^{12}$ is an alkyl group having 1 or 2 carbon atoms.

5. An antifouling coating composition according to claim 1 or 2, wherein the at least one constituent unit (a) is represented by the formula:

 (VII)

wherein n is zero or 1; $X^4$ is an oxygen atom, a sulfur atom or —NH—; $R^{13}$ is a straight, branched or cyclic alkylene group; and $R^{14}$ is a straight, branched or cyclic alkyl group, an aryl group, a heterocyclic group or an aralkyl group.

6. An antifouling coating composition according to claim 3, wherein in the formula (V), $X^2$ is an oxygen atom and $R^{11}$ is an alkyl group having 5, 9, 11, 13 or 17 carbon atoms.

7. An antifouling coating composition according to claim 4, wherein in the formula (VI), $X^3$ is an oxygen atom and $R^{12}$ is an alkyl group having 4, 8 or 18 carbon atoms.

8. An antifouling coating composition according to claim 2, wherein the compound (B) is at least one member selected from the group consisting of alcohols, carboxylic acid esters, phosphoric acid esters, amides and thioureas.

9. An antifouling coating composition according to claim 2, wherein the compound (C) is at least one member selected from the group consisting of benzotriazole derivatives, amino-substituted triazole derivatives, sulfur-substituted benzothiazole derivatives, sulfur-substituted thiazole derivatives, 1,2,3-benzotriazole, 1,2,4-triazole and 3-amino-1H-1,2,4-triazole.

10. An antifouling coating composition according to claim 1 or 2, wherein the antifouling agent is an organic antifouling agent.

11. An antifouling coating composition according to claim 1 or 2, wherein the antifouling agent is an inorganic antifouling agent.

12. A process which comprises coating an antifouling coating composition of claim 1 or 2 on an underwater or submarine structure.

\* \* \* \* \*